United States Patent
Engström

(10) Patent No.: US 8,942,137 B2
(45) Date of Patent: Jan. 27, 2015

(54) METHOD AND ARRANGEMENT IN A TELECOMMUNICATION SYSTEM

(75) Inventor: Stefan Engström, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 111 days.

(21) Appl. No.: 13/383,303

(22) PCT Filed: Jul. 14, 2009

(86) PCT No.: PCT/SE2009/050898
§ 371 (c)(1),
(2), (4) Date: Jan. 10, 2012

(87) PCT Pub. No.: WO2011/008141
PCT Pub. Date: Jan. 20, 2011

(65) Prior Publication Data
US 2012/0113814 A1 May 10, 2012

(51) Int. Cl.
*H04L 12/28* (2006.01)

(52) U.S. Cl.
USPC ........................................................ 370/254

(58) Field of Classification Search
CPC ......... H04L 41/12; H04L 45/02; H04L 45/00; H04L 45/04; H04W 84/18
USPC ........................................................ 370/254
See application file for complete search history.

(56) References Cited

U.S. PATENT DOCUMENTS

| | | | |
|---|---|---|---|
| 4,823,914 A * | 4/1989 | McKinney et al. | 187/393 |
| 6,130,886 A * | 10/2000 | Ketseoglou et al. | 370/347 |
| 6,639,895 B1 * | 10/2003 | Helles | 370/219 |
| 2001/0052087 A1 * | 12/2001 | Garg | 714/37 |
| 2002/0004406 A1 * | 1/2002 | Namura et al. | 455/515 |
| 2003/0061004 A1 * | 3/2003 | Discenzo | 702/182 |
| 2006/0101400 A1 * | 5/2006 | Capek et al. | 717/120 |
| 2007/0086052 A1 * | 4/2007 | Furuya | 358/1.15 |

FOREIGN PATENT DOCUMENTS

| | | |
|---|---|---|
| GB | 2386209 A | 9/2003 |
| JP | H08251097 A | 9/1996 |
| JP | 2006121474 A | 5/2006 |
| WO | 02/098147 A2 | 12/2002 |

OTHER PUBLICATIONS

Lehser, F. "Next Generation Mobile Networks Use Cases Related to Self Organising Network, Overall Description." A Deliverable by the NGMN Alliance, NGMN Technical Working Group "Self Organising Networks, Project 12," Version 2.02, Dec. 5, 2008.

Sahai, A. et al. "Towards Distributed and Dynamic Network Management." IEEE Network Operations and Management Symposium, 1998, vol. 2, New Orleans, LA, USA, Feb. 15-20, 1998.

* cited by examiner

*Primary Examiner* — Ronald Abelson
(74) *Attorney, Agent, or Firm* — Murphy Bilak & Homiller, PLLC

(57) ABSTRACT

The present invention relates to a method and arrangement in a telecommunication system, in particular to methods and arrangements for supporting maintenance activities of units in a telecommunication network.

10 Claims, 5 Drawing Sheets

METHOD AND ARRANGEMENT IN A TELECOMMUNICATION SYSTEM

FIELD OF THE INVENTION

The present invention relates to a method and arrangement in a telecommunication system, in particular to methods and arrangements for supporting maintenance activities of units in a telecommunication network.

BACKGROUND

Telecommunication networks, e.g. as illustrated in FIG. 1, typically consist of a large number of network units responsible for providing communication services to and from user equipments connected to said network. The coverage area of the radio base stations thereby constitutes the geographical area that can be served by such a network, whereby the placement of radio base stations depends on many factors, e.g. the shape of geographical area, traffic density, etc.

In order to guarantee a proper working of the network but also for improving service range and service quality in the network, it is necessary to perform, e.g. regularly or at suitable instances, various maintenance tasks in the network units. This implies inter alia software maintenance and upgrades but also error corrections or fine-tuning of parameters for improved network performance. It is thus necessary to take network units out of service during such maintenance which implies, in particular with regard to the radio base stations, that a certain geographical area will have no or reduced radio coverage during the maintenance time. This locally reduced network performance will also impact neighbouring radio base stations.

It is perceived to be a problem that networks at regular times will have reduced coverage and experience increased radio traffic disturbances.

Handling the impact of such problems needs either planning of the maintenance activities by the network operator or needs already be taken into consideration in advance when designing the network. For instance, the network operator can apply a randomised scheme or individually trigger according to a planned sequence radio base stations that are temporarily out of order for maintenance activity. However, these measures only can lead to a reduced impact of maintenance activities which is, e.g. in case of a randomised scheme, not entirely under the control of the network operator.

Known solutions of network management services refer to distributed and policy-based procedures with self-configuration capabilities where the network entities in the system can be seen as a potential manager for a set of local (re-)configuration tasks.

SUMMARY

It is an object of embodiments of the present invention to overcome the problems as described above. This is achieved by the teaching of claims 1 and 8. Dependent claims describe further embodiments of the invention.

Briefly, it is the basic concept of the present invention that all or parts of the network units, e.g. radio base stations, in a telecommunication network are ordered to perform a software maintenance activity; however, without prescribing a certain order for performing these activities. A network unit thus informs its neighbour network units that it intends to perform the maintenance activity where after the neighbour network units will postpone their maintenance activities until the radio base station is back in full operation.

The present invention allows the advantage that only one network unit among several neighboured network units is out of order for maintenance activities whereby the surrounding network units can handle at least parts of the possible traffic for the maintenance network units which otherwise would be lost.

The present invention also implies the advantage that network maintenance is considerably simplified for the network operator.

Other objects, advantages and novel features of the invention will become apparent from the following detailed description of the invention when considered in conjunction with the accompanying drawings and claims.

DETAILED DESCRIPTION

Figure 1:
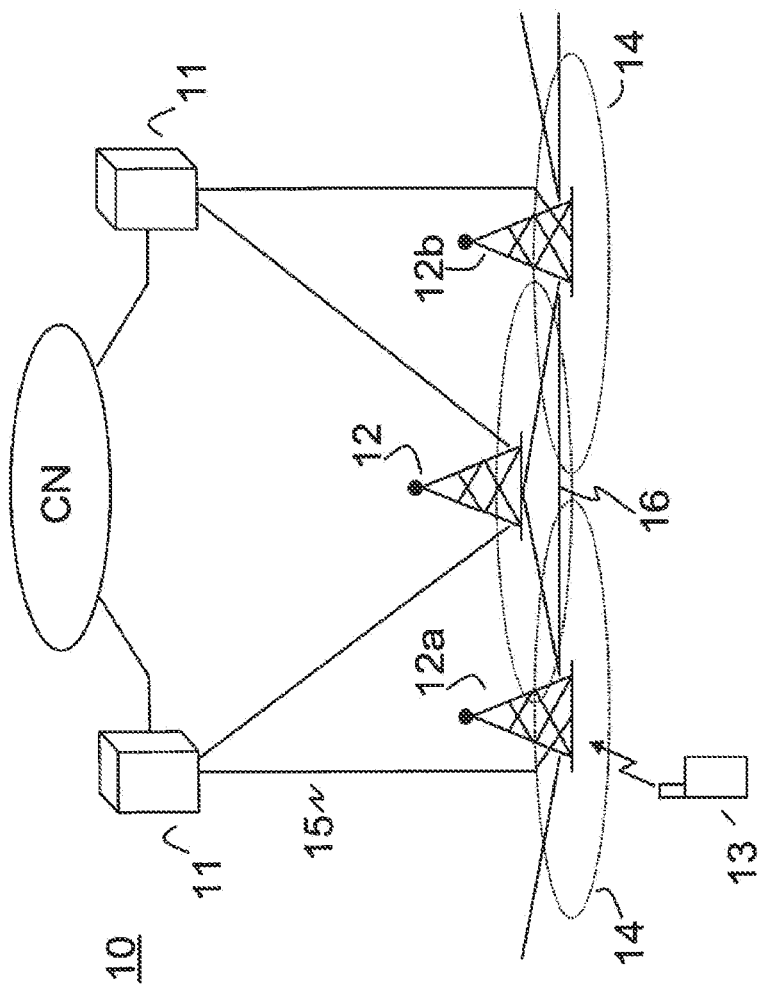
FIG. 1 illustrates a part of a telecommunication network including a plurality of network units.

In the description of the embodiments according to the present invention the following expressions are used: Telecommunication network 10: The embodiments of the present invention are applicable to any kind of fixed network or radio access network, e.g. a UTRAN or evolved UTRAN.

Network unit 11,12: Denotes an arrangement of the telecommunication network that is responsible to support communication services in said network. This can be, e.g., a radio base station, a general packet radio service support node, a mobility management entity, a location register.

Neighbour network unit 12a,12b: Denotes a network unit as described above, which network unit can, at least partly, take over tasks over another network unit 12. For instance, a neighbour radio base station 12a is another base station covering partly the same geographical area and can thus serve user equipments 13 in the overlapping area.

Maintenance activities: Denotes, in general, service activities in a network unit 11,12 that will make it necessary to temporarily take the unit out of order from its normal services. The activities can relate to software upgrades, maintenance, or error corrections.

The present invention addresses the situation that an operator of a telecommunication network 10 as described in FIG. 1 needs to perform maintenance activities for one or more network units 11,12 which will make it necessary to take said units out of service for a certain time period. This is specified by defining all or a group of network units for said maintenance together with a time window, e.g. one week, within which the network units shall initiate this activity. In an embodiment of the present invention, the operator may also specify one or more network units that start the maintenance activity. All involved network units thus receive the same maintenance request from the operator, which is not individually adapted to the specific network units.

Figure 2A:
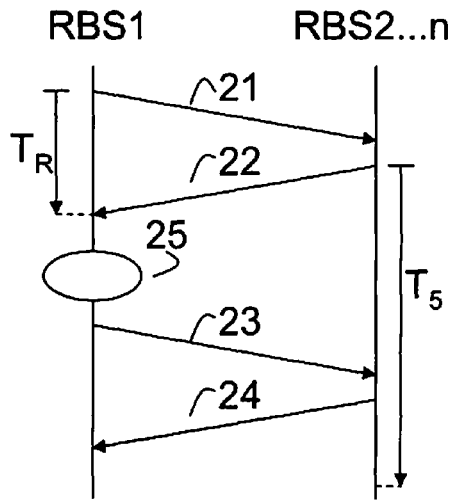
FIGS. 2a-2d illustrate signalling diagrams of the embodiments of the present invention.

FIGS. 2a-2d show signalling diagrams illustrating the present invention with radio base stations as an example of network units. The signalling may be sent over suitable interfaces in said telecommunication network. For instance, in an evolved UTRAN the interfaces S1 or X2 can be applied. In FIG. 2a, a radio base station RBS1 that is going to perform software maintenance activities sends a maintenance indication message 21 to all its neighbour base stations RBS2 . . . n. Embodiments of the present invention include, e.g., that the maintenance indication includes a time value [$T_5$] of the exact or estimated time during which the radio base station will be out of order due to maintenance. Alternatively, no explicit time value is indicated but instead a normal maintenance downtime period is commonly known by the radio base stations.

The radio base station of each neighbour cell responds after reception of the maintenance indication message 21 with a maintenance acceptance message 22. In embodiments of the present invention, the reception message can contain an indication that the neighbour base station is currently operable and will remain so during the maintenance period of RBS1. After having performed its maintenance activities 25, RBS1 sends a maintenance completed message 23 indicating that RBS1 is fully operable again and, thus, that one of the neighbour base stations could start its maintenance procedures. Also the receipt of this message is confirmed by each of the neighbour radio base stations by a maintenance completed confirm message (24).

Figure 2B:
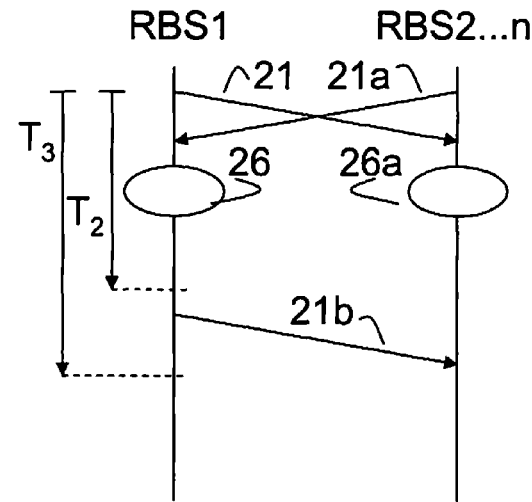

The fact that network maintenance is handled in a decentralised way by the individual radio base stations implies that within a time period $T_R$ several radio base stations can intend to start their maintenance activities. This is illustrated in FIG. 2b. A maintenance indication message 21, e.g. sent by RBS1, can thus during this time period collide with corresponding maintenance indication messages 21a sent by neighbored radio base stations. The time period $T_R$ is defined by the message roundtrip time (the accumulated time it takes for a message to be transmitted from a first unit to a second unit, back from said second unit to the first unit, and the processing time in said second unit). Therefore, the embodiments of the present invention can provide for mechanisms to resolve such collisions, e.g. as depicted in FIG. 2b. In case the radio base station RBS1 receives a maintenance indication message 21a from one of the neighbour radio base station RBS2 . . . n after having sent an own maintenance indication message 21 but before having received a maintenance acceptance message 22 from said neighbour base station, the radio base station RBS1 aborts 26 its request for maintenance and starts a randomised timer with a value selected from an interval [$T_2;T_3$] where $T_2$ denotes a time at least equal to or larger than the message roundtrip time $T_R$ between the neighbour base stations and where $T_3$ denotes a suitably selected time larger than $T_2$. As apparent from FIG. 2b, also other neighbour radio base stations RBS2 . . . n that were involved in the collision abort 26a their maintenance request and wait a randomised time as described above. After the randomly determined time has expired, each of the radio base stations involved in the collision can again try to send a maintenance indication message 21b (unless it did not already receive a maintenance indication message from another radio base station).

Figure 2C:
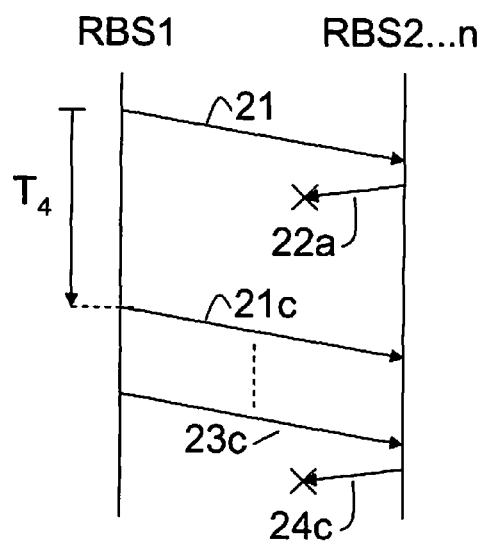

Embodiments of the present invention also need to provide mechanisms to handle situations where one or more of the messages introduced in FIG. 2a do not reach the recipient. FIG. 2c depicts the case where no response message 22a or 24c has been received. This implies of course also the case where the message that should trigger such response message did not reach the unit to respond.

In case no maintenance acceptance message 22a has been received in response to a maintenance indication message 21 (or in case the maintenance indication message 21 did not reach a neighbour radio base station), the requesting radio base station RBS1 waits for a time $T_4$, which has at least the length of the roundtrip time $T_R$, before retransmitting 21c its maintenance indication message. This procedure can be repeated one or several times; however, if no maintenance accepted message 22 has finally been received within a time which has at least the length of the roundtrip time $T_R$ plus the normal maintenance downtime period, the radio base station continues with its maintenance activities as if an accept message had been received.

There will be a difference in time of arrival for the maintenance acceptance messages from different neighbour RBSs. This difference in time means that the maintenance activity in RBS1 will start later than anticipated by the neighbour RBSs that sent their maintenance acceptance messages before. By resending the maintenance indication message to one or more of the neighbour RBSs answering first, the RBS1 may prohibit that any RBS will assume that the maintenance is finished, timer T5 has elapsed, and start their own maintenance activity before RBS1 is back in operation.

In case no response 24c has been received after having sent a maintenance completed message 23c, the complete message 23c can be re-sent one or several times.

Figure 2D:
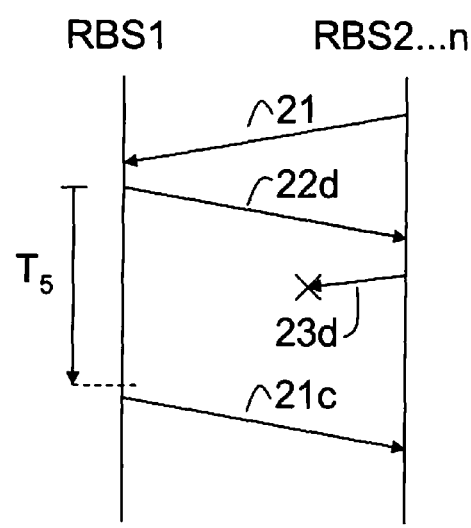

FIG. 2d depicts the case where a radio base station RBS1, after having sent a maintenance acceptance message 22d, does not receive any maintenance complete message 23d within a time interval $T_5$, where $T_5$ denotes a time that is longer than any normal maintenance activity. Then the radio base station RBS1 can after expiry of the time period $T_5$ initiate its own maintenance activities by sending a maintenance indication message 21d.

Figure 3:
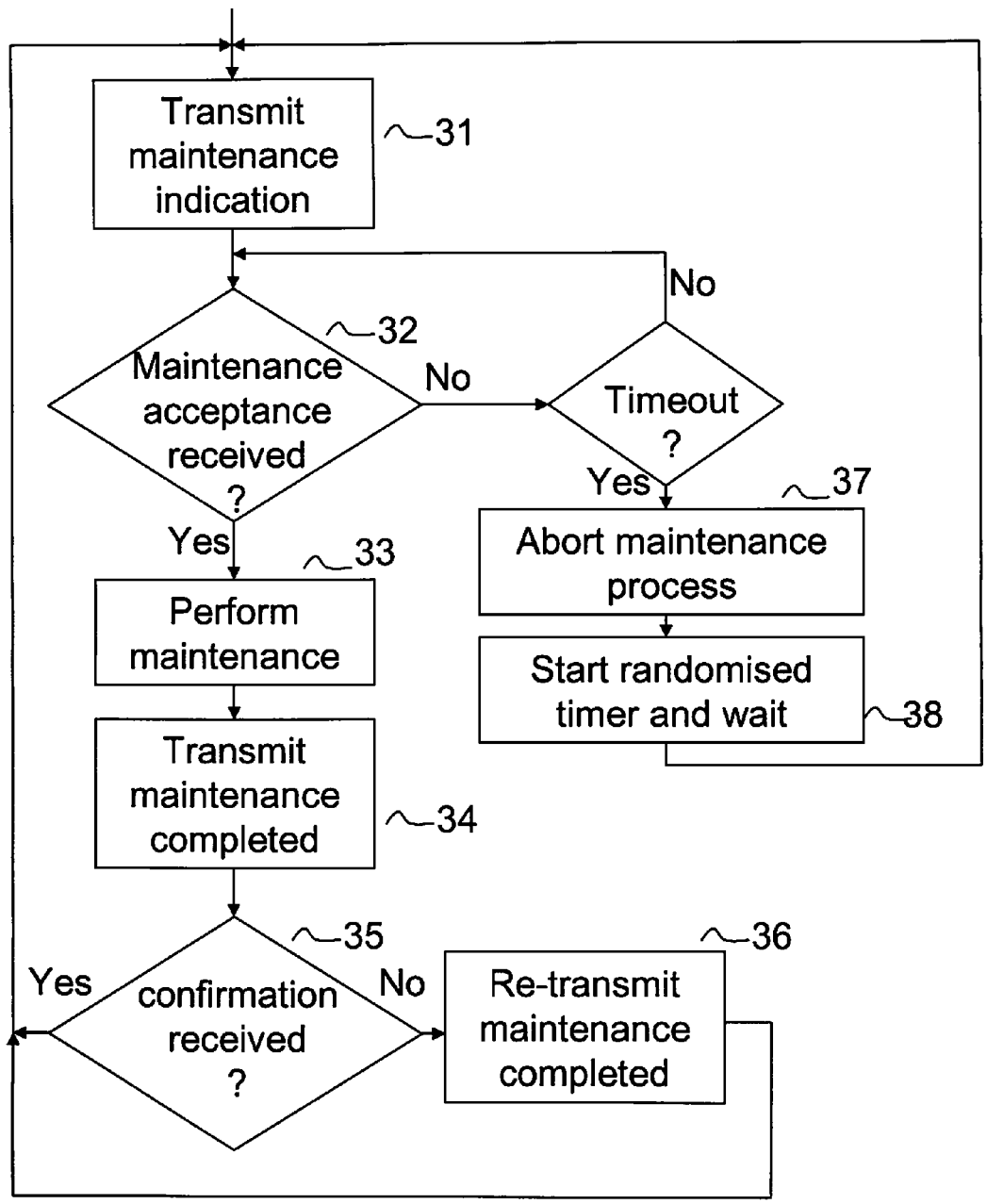
FIG. 3 shows a flow chart of the method according to an embodiment of the present invention for a network unit that intends to perform maintenance activities.

FIG. 3 shows a flow chart of the method according to an embodiment of the present invention for a network unit 12 that intends to perform maintenance activities. The network unit transmits 31a maintenance indication message 21 to its neighbour network units 12a,12b. When maintenance acceptance messages have been received 32Yes from said neighbour network units, the network unit 12 performs 33 its maintenance and transmits 34 a maintenance completed message 23 when finished. The network unit can await 35 maintenance completed confirm messages 24 from the neighbour network units 12a,12b and, if such messages are not received in time 35Yes re-transmit 36 said maintenance completed messages. Where no maintenance acceptance messages have been received 32No from at least one of the neighbour network units 12a,12b (e.g. because the indication or acceptance message got lost during transmission or one or more neighbour network units has transmitted a maintenance indication message before having received the maintenance indication message of the network unit), the maintenance process is aborted 37 and the network unit starts 38 a randomised timer and waits this time until re-transmitting a maintenance indication message.

Figure 4:
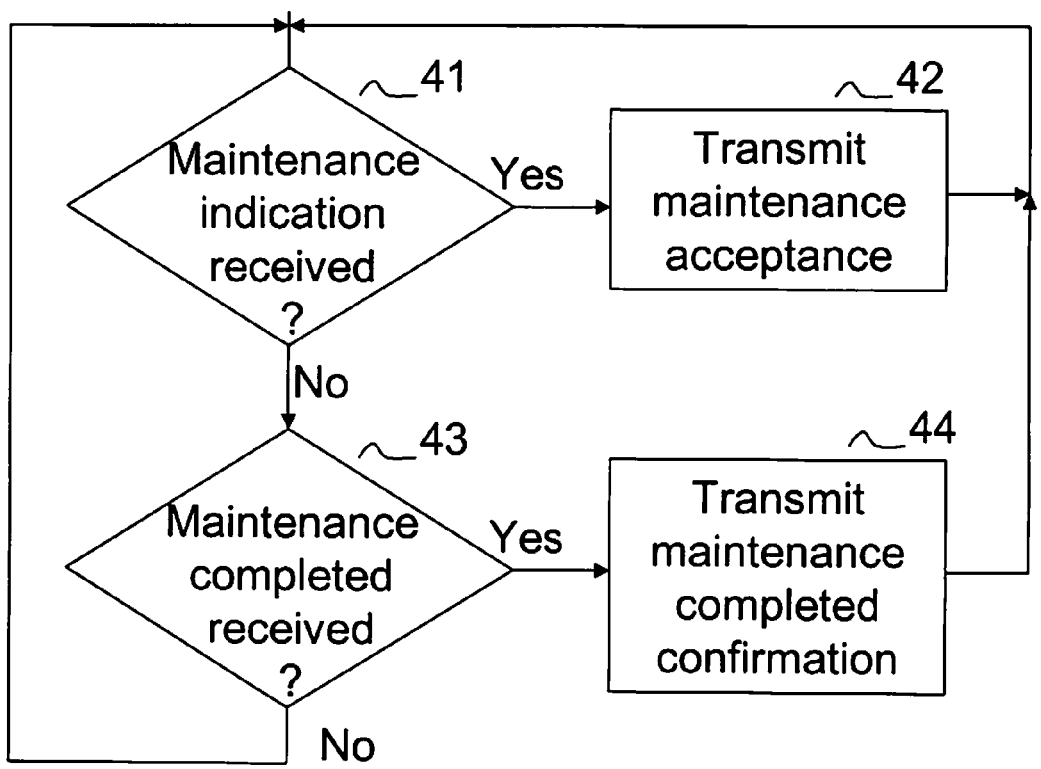
FIG. 4 shows a flow chart of the method according to an embodiment of the present invention for a network unit in its role as a neighbour network unit of a network unit that intends to perform maintenance activities.

FIG. 4 shows a flow chart of the method according to an embodiment of the present invention for a network unit in its role as a neighbour network unit of a network unit that intends to perform maintenance activities. On reception 41Yes of a maintenance indication message 21 the network unit shall transmit back 42 a maintenance acceptance message 22 and suppress own maintenance activities during the time specified for maintenance of the requesting network unit. On reception 43Yes of a maintenance completed message 23 the network unit shall re-transmit 44 a maintenance completed confirm 24 message.

Figure 5:
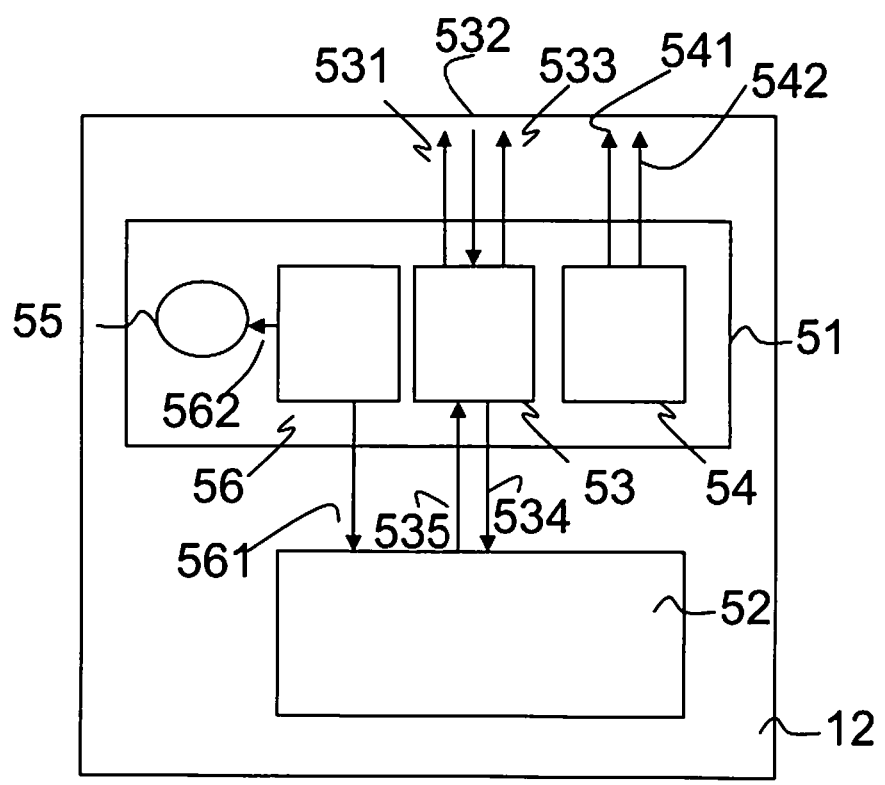
FIG. 5 illustrates an arrangement according to the present invention adapted to perform the embodiments of the method according to the present invention.

FIG. 5 illustrates an arrangement 51 adapted to perform the embodiments of the method according to the present invention and supports maintenance activities of said network unit 12 which are controlled by a maintenance activity control unit 52.

The arrangement 51 includes a timer 55 adapted to measure a randomly selected time and electronic circuits whereof
- a first electronic circuitry 53 is adapted to provide 531a maintenance indication message 21 to be transmitted to neighboured network units after having received an indication 535 to start maintenance activity; to await 532 a maintenance acceptance message 22 from said neighboured network units; to indicate 534 to turn off service provision and perform said maintenance activities; and to provide 533 a maintenance completed message 23 after said maintenance activity when ready for operation;
- a second electronic circuit 54 is adapted to provide 541a maintenance acceptance message 22 to a neighboured network unit 12a,12b in response to a received message 21 indicating a transit to a maintenance state; and to provide 542 a maintenance completed confirm message 24 to a neighboured network unit 12a,12b in response to a received message 23 indicating a transit from a maintenance state.
- a third electronic circuitry 56 is adapted to provide 561 an indication to abort the maintenance process when no maintenance acceptance message is received from a neighbour unit 12a,12b in a direct response to a transmitted maintenance indication message 21; and to start 562 a randomised timer 55 and wait until said timer has expired before re-sending a maintenance indication message 21.

The invention claimed is:

1. A method in a network unit providing communication services to user equipments in a telecommunication network that includes a plurality of interconnected network units, said method supporting maintenance activities of said network unit and comprising:
   indicating to neighboured network units a transit to or from a maintenance state during which said network unit is not operable for providing said communication services; and
   suppressing, for a time specified for such maintenance activities, a transit to the maintenance state, after having received such indication from one of said neighboured network units.

2. The method of claim 1, wherein said indicating comprises:
   transmitting a maintenance indication message to said neighboured network units before starting any maintenance activity;
   waiting for a maintenance acceptance message from said neighboured network units;
   turning off service provision and performing said maintenance activity; and
   sending a maintenance completed message to said neighboured network units after said maintenance activity, when said network unit is ready for operation.

3. The method of claim 2, wherein the maintenance indication message contains a time value indicating how long the network unit will be out of order.

4. The method of claim 2, wherein when no maintenance acceptance message is received from a neighbour unit in direct response to a transmitted maintenance indication message, the method further includes:
   aborting a maintenance process for which said indicating was performed;
   starting a randomized timer; and
   waiting until said timer has expired before re-sending a maintenance indication message.

5. The method of claim 4, wherein the value of the randomized timer is selected at least equal to or larger than a message roundtrip time.

6. The method of claim 1, further comprising:
   transmitting a maintenance acceptance message to one of said neighboured network units in response to receiving a message indicating a transit by said neighboured network unit to the maintenance state; and
   transmitting a maintenance completed confirm message to said neighboured network unit in response to receiving a message indicating a transit by said neighboured network unit from the maintenance state.

7. The method of claim 6, wherein the maintenance acceptance message includes a confirmation that the network unit is currently operable and will remain so during the maintenance period.

8. An arrangement in a network unit providing communication services to user equipments in a telecommunication network, said telecommunication network including a plurality of interconnected network units, and said arrangement supporting maintenance activities at said network unit and comprising first electronic circuitry that is configured to:
   provide a maintenance indication message to be transmitted to neighboured network units after having received an indication to start a maintenance activity;
   await a maintenance acceptance message from said neighboured network units;
   indicate to turn off service provision and perform said maintenance activities; and
   provide a maintenance completed message after said maintenance activity, when ready for operation.

9. The arrangement of claim 8, further comprising second electronic circuitry configured to:
   provide a maintenance acceptance message to a neighboured network unit in response to a received message indicating a transit to the maintenance state by said neighboured network unit; and
   provide a maintenance completed confirm message to said neighboured network unit in response to a received message indicating a transit from the maintenance state by said neighboured network unit.

10. The arrangement of claim 8, further comprising a timer connected to third electronic circuitry of said arrangement, said timer configured to measure a randomly selected time and said third electronic circuitry configured to:
   provide an indication to abort a maintenance process for which said maintenance indication message was provided, when no maintenance acceptance message is received from a neighbour unit in direct response to transmission of the maintenance indication message; and
   start said randomised timer and wait until said timer has expired before re-sending a maintenance indication message.

* * * * *